Figure 1:
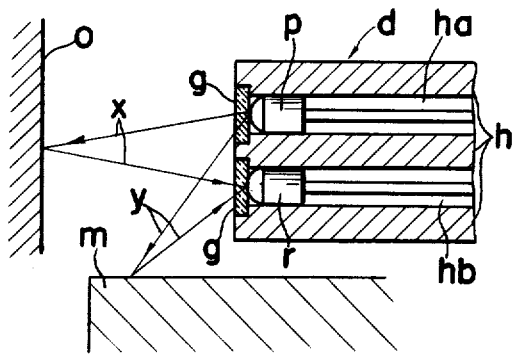

United States Patent [19]

Fukuyama et al.

[11] 4,051,365

[45] Sept. 27, 1977

[54] PHOTOELECTRIC DETECTOR HAVING AN INDICATOR FOR INDICATING THE OPERATING CONDITION THEREOF

[75] Inventors: Toshifumi Fukuyama; Yasunori Asakura; Norio Onji, all of Nagaokakyo, Japan

[73] Assignee: Omron Tateisi Electronics Co., Japan

[21] Appl. No.: 692,148

[22] Filed: June 2, 1976

Related U.S. Application Data

[63] Continuation of Ser. No. 493,157, July 30, 1974, abandoned.

[30] Foreign Application Priority Data

Aug. 8, 1973 Japan .............................. 48-93679[U]
Aug. 13, 1973 Japan .................................. 48-90759

[51] Int. Cl.[2] ............................................. G01D 21/04
[52] U.S. Cl. .................... 250/222 R; 250/552; 250/239
[58] Field of Search .............. 250/216, 221, 222, 239, 250/226, 561, 552, 229, 339, 341; 357/19; 340/258 B

[56] References Cited

U.S. PATENT DOCUMENTS

| 3,444,544 | 5/1969 | Pearson et al. ................. 340/258 B |
| 3,576,277 | 4/1971 | Blackmon ............................ 250/221 |
| 3,654,477 | 4/1972 | Benjamin ............................. 250/239 |
| 3,737,685 | 6/1973 | Sharp ................................... 250/221 |
| 3,816,745 | 6/1974 | Primm et al. ....................... 250/221 |
| 3,842,263 | 10/1974 | Kornrumpf et al. ................ 250/552 |
| 3,862,415 | 1/1975 | Harnden et al. ..................... 250/239 |

*Primary Examiner*—David C. Nelms
*Attorney, Agent, or Firm*—Craig & Antonelli

[57] ABSTRACT

A photoelectric detector for detecting the presence of an object which comprises at least a light ray projecting element, for example, of a luminescent diode and a light ray receiving photoelectric element, for example, of a photo transistor. The two elements are respectively received in bores formed in a housing in such a manner that only the light rays emitted by the projecting elements is received by the receiving element with any lights due to irregular reflection prevented from reaching the receiving element so as to avoid erroneous functioning of the detector.

15 Claims, 7 Drawing Figures

(a)

(b)

PHOTOELECTRIC DETECTOR HAVING AN INDICATOR FOR INDICATING THE OPERATING CONDITION THEREOF

This is a continuation of application Ser. No. 493,157, filed July 30, 1974, now abandoned.

The present invention relates to a photoelectric detector, and more particularly to a reflecting type photoelectric detector having photoelectric elements, such as a light ray projecting element, for example, of a luminescent diode and a light ray receiving element, for example, of a photo transistor.

The conventional photoelectric detectors of the above described type are generally divided into two groups, i.e., one with a lens system and the other without a lens systems. In such conventional photoelectric detectors, particularly in one without a lens system, the directivity of the photoelectric detector is determined by the directivity of the photoelectric element itself, but since such a photoelectric element normally has a large angle of directivity, the photoelectric detector naturally tends to have a large angle of directivity, which fact, however, results in such disadvantages that, besides the light rays reflected from the object to be detected, lights due to irregular reflection including light rays directly reaching the receiving element from the light projecting element and light rays reflected, for example, by supporting members of the photoelectric detector, enter the light ray receiving element, which fact may impart noises to the normal operating signals for the photoelectric detector, causing the detector to function erroneously.

On the other hand, the light ray projecting element and the light ray receiving element which are provided on the front portion of the photoelectric detector tend to be soiled by dust or subject to various shocks.

Furthermore, since the light ray projecting element usually comprises the luminescent diode which projects light rays of specific wave lengths, it is desirable to provide, in front of such photoelectric elements, a filter which passes only the light rays emitted by the projecting element, partly for preventing the receiving element to mis-function by light rays of other wave lengths and also for protecting both photoelectric elements on the whole, and such a filter should preferably be of a single light passing plate from the view point of appearance and easiness in manufacturing of the photoelectric detector, in which case, however, there is a possibility for the photoelectric detector to function erroneously since part of the light emitted from the light ray projecting element is reflected by the light passing plate and directly enters the light ray receiving element.

In order to eliminate such a disadvantage, a photoelectric detector as described below is conventionally proposed.

FIG. 1 is a cross sectional side view of a conventional photoelectric detector.

This conventional detector $d$ comprises a cylindrical housing $h$ axially bored to provide two openings $ha$ and $hb$ in which a light ray projecting element $p$ and a light ray receiving element $r$ are received respectively with a light passing plate $g$ provided in front of each of the elements $p$ and $r$ separately. Even with the above arrangement, however, the possibilities for the detector $d$ to mis-function are still present since, besides the light rays emitted by the element $p$ and reflected by an object O so as to be incident upon the element $r$ through the normal light path X, part of the light rays from the element $p$ may be reflected, for example, by a fixing member $m$ to enter the element $r$ through a light path Y.

Furthermore, in the conventional photoelectric detector $d$ of the above described type, the manufacturing process thereof is unavoidably complicated with consequent increase in production cost.

Accordingly, an essential object of the present invention is to provide a photoelectric detector of reflecting type which is stable, dependable and accurate in functioning, and free from adverse effect due to irregular reflection of light with substantial elimination of the disadvantages inherent in the conventional photoelectric detectors.

Another important object of the present invention is to provide a photoelectric detector of the above described type which is simple in construction and easy of maintenance.

A still further object of the present invention is to provide a photoelectric detector of the above described type which can be easily manufactured at low cost.

According to a preferred embodiment of the present invention, the photoelectric detector of reflecting type comprises a cylindrical housing provided with two openings axially bored in parallel to each other, a light ray projecting element and a light ray receiving element received in the openings respectively with a predetermined distance between the light receiving surface at the front of the housing and the front surfaces of above elements, and a single filter provided on said light receiving front surface of the housing. The provision of the light ray projecting and receiving elements at positions in the housings spaced away from the light receiving surface at the front of the detector housing is effective for preventing light rays due to irregular reflection from entering the light ray receiving element. Furthermore, the filter provided on the light receiving surface not only prevents the incidence of irregularly reflected light rays upon the light ray receiving element, but advantageously protects the photoelectric elements incorporated in the housing.

Figure 2:
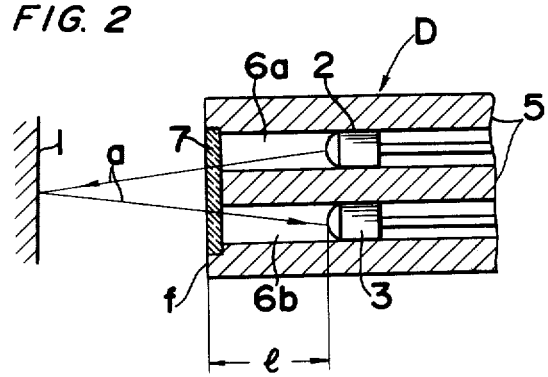
Figure 3:
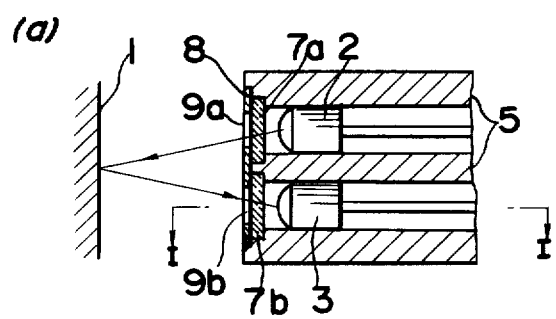
Figure 3:
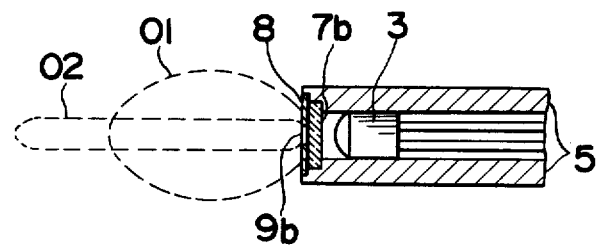
Figure 4:
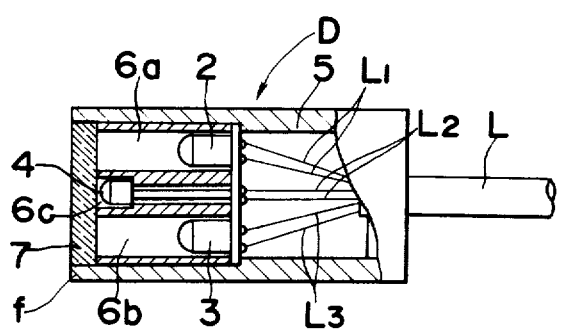
Figure 6:
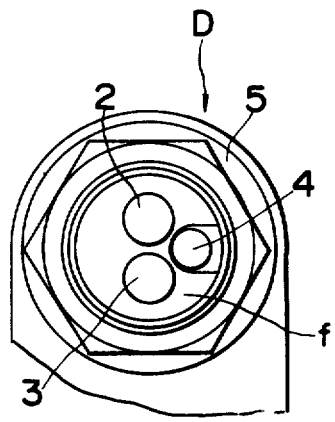
Figure 5:
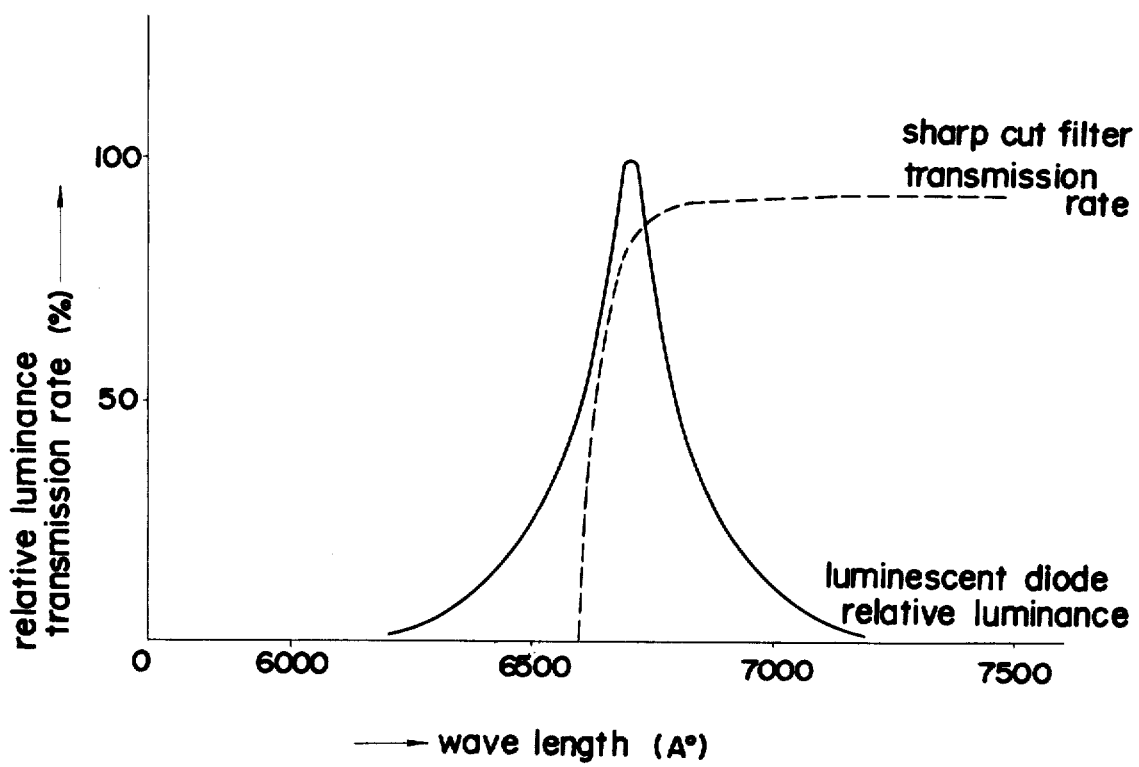

These and other objects of the present invention will be come apparent from the following description taken in conjunction with the preferred embodiment thereof with reference to the accompanying drawings, in which;

FIG. 2 is a schematic cross sectional side view of a photoelectric detector according to an embodiment of the present invention, FIG. 3(a) is a schematic cross sectional side view of a first modification of the photoelectric detector of FIG. 2, FIG. 3(b) is a cross sectional view taken along the line I—I in FIG. 3(a), FIG. 4 is a schematic cross sectional side view of a second modification of the photoelectric detector of FIG. 2, FIG. 5 is a graph showing relation between wave lengths and transmission rates of filters, and FIG. 6 is a schematic front view of a third modification of the photoelectric detector of FIG. 2.

Before the description of the present invention proceeds, it is to be noted that like parts are designated by like numerals throughout the several views of the accompanying drawings.

Referring to FIG. 2, the photoelectric detector D of the present invention comprises a cylindrical housing 5 provided with two openings 6a and 6b axially bored in parallel and in spaced relation to each other, a light ray projecting photoelectric element 2, for example, of a luminescent diode and a light ray receiving photoelectric element 3, for example, of a photo transistor received in said openings 6a and 6b respectively with a predetermined distance 1 kept between the light ray receiving surface f at the front of the housing 5 and the surface of each of the elements 2 and 3, and a filter 7 fixed on the light reciving surface f. The inner periferies of the openings 6a and 6b should preferably be minimized in surface reflection, either by employing a material hard to reflect light for the housing 5, or by coating the inner surfaces of the openings 6a and 6b with light absorbing paint, or by forming small concave and convex portions on the inner surfaces thereof. Since the angle of directivity decreases with the increase of the distance 1 between the light receiving surface f and the surface of the photoelectric element 2 or 3, the distance 1 which serves as a passage of light should be determined depending on the desired angle of directivity. The filter 7 provided on the light receiving surface f of the housing 5 can be a single filter suitable for preventing light rays due to irregular reflection.

By this arrangement, the light emitted from the element 2 is provided onto an object 1 to be detected through the portion of the opening 6a covered by the distance 1 and through the filter 7, and reflected by the object 1 into the element 3 through the filter 7 and the portion of the opening 6b covered by the distance 1, forming a light path shown by the line a. Since only the light having a predetermined directivity is projected and received by the elements 2 and 3 through the light passages 6a and 6b, any light rays due to irregular reflection can be eliminated without disturbing the necessary reflected light rays from the object 1. In addition to the effect of the filter 7 for protecting the photoelectric elements 2 and 3 and for preventing lights due to irregular reflection, as the reflected light rays on the surface of the filter 7 do not reach the light receiving element 3, any dust adhering to the surface of the filter 7 has no adverse effect to the functioning of the detector D, and besides, the provision of separate filters each for the elements 2 and 3 can be dispensed with by installing the single filter 7 covering both elements 2 and 3 simultaneously, which arrangement improves appearance of the front surface of the detector D as well as the efficiency in manufacturing of the detector D.

Referring now to FIG. 3(a), there is shown a first modification of the embodiment of FIG. 2. In this modification, two separate filters 7a and 7b are each provided at the front of the elements 2 and 3 with the filters 7a and 7b secured to the front surface of the detector D by adhering to the surfaces of the filters 7a and 7b a name-plate 8 having slits 9a and 9b corresponding in positions to the filters 7a and 7b. The light ray projecting element 2 should preferably be a luminescent diode emitting infrared rays with high energy conversion efficiency, and by employing filters which pass the infrared rays only as the filters 7a and 7b, light rays of other wave lengths can be filtered out, so that the light ray receiving element 3 responds only to the light emitted from the light ray projecting element 2 and reflected by the object 1 to be detected for preventing any misfunctioning of the detector D.

In the above modification, the name plate 8 which is normally used for indicating the type and manufacturing number, etc., of a unit is advantageously utilized for fixing the filters 7a and 7b in place by forming two corresponding slits 9a and 9b in the name plate 8, so that two parts, i.e., a name plate and a fixing plate can be combined into one plate 8 for simple construction of the detector D.

It should be noted here that various directivities can be imparted to the detector D depending upon the shape of the slits 9a and 9b.

Referring to FIG. 3(b), on the assumption that the slits 9a and 9b are too large to function as slits, the directivity of the detector D is as shown in the dotted line 01 with a large angle of directivity and a short distance to be covered, while if the slit is of a rectangular shape with its long side kept horizontal, the directivity is as shown in the dotted line 02 with a small angle of directivity and a long distance to be covered.

In the photoelectric detector D in the above modification, it is possible to eliminate any light rays due to irregular reflection, particularly unnecessary reflected lights, with only the light reflected by the object to be detected being received by the element 3.

Moreover, the filters 7a and 7b are effective not only for the protection from dust, but for preventing light rays due to irregular reflection from entering the element 3 with only light rays of a predetermined wave length allowed to pass therethrough.

Accordingly, the detector D is free from erroneous functioning, since any noises resulting from irregularly reflect light rays are almost completely eliminated as described above.

Furthermore, the formation of the slits 9a and 9b in the name plate 8 allows the plat 8 to serve as two parts simultaneously with resultant simple construction and low manufacturing cost of the detector D. Since the name plate 8 is adapted to be adhered to the housing 5, the filters 7a and 7b can be fixed at the same time to the housing 5, thus unnecessary labor and possible soiling of the filters 7a and 7b due to adhesive can advantageously be avoided in manufacturing.

It is needless to say that the two filters 7a and 7b described as employed in the above modification may be replaced by a single filter covering the two elements 2 and 3 simultaneously as in the embodiment in FIG. 2, and that the shape of the slits 9a and 9b may be modified in various ways to suit the purposes.

Referring now to FIGS. 4 and 5, there is shown a second modification of the embodiment of FIG. 2. In this modification, in addition to the photoelectric elements 2 and 3, a luminescent diode 4 for indication of the function of the detector D is provided in an opening 6c axially bored in the housing in parallel to and in spaced relation to the openings 6a and 6b for the light ray projecting element 2, for example, of a luminescent diode and the light ray receiving element 3, for example, of a photo transistor. The luminescent diode 4 for indication is disposed at a position closer to the light receiving surface f of the detector D than the photoelectric elements 2 and 3 and is adapted to emit visible light depending on the functioning condition of the detector D. These photoelectric elements 2, 3 and 4 are connected to a main circuit (not shown) through leads L1, L2 and L3 respectively which are combined into a cable L led out of the device D at the rear portion thereof for receiving and transmitting necessary signals from and to the main circuit. The luminescent diode 4 is controlled to be turned on or off by a signal transmitted through the leads L2 so as to normally remain "off" and to be lit when the object is detected, or vice versa.

A single filter 7 is fixed at the front portion of of the housing 5 so at to cover and protect the photoelectric elements 2, 3 and 4. The filter 7 is a "sharp cut" filter having a sharp selectivity for wave lengths, passing light rays of specific wave lengths only and is intended to prevent erroneous functioning of the detector D due to irregularly reflected light rays.

In other words, in the photoelectric detector D of the above modification an infrared ray luminescent diode which is commonly used because of its high energy conversion efficiency is employed for the light ray projecting photoelectric element 2, while a filter having light transmission characteristics as shown by the dotted line in FIG. 5 is adopted for the filter 7, in which case irregularly reflected light rays with wave lengths shorter than 6600 A such as visible light rays, do not reach the light ray receiving photoelectric element 3, so that the detector D is hardly affected by such irregularly reflected rays.

In the photoelectric detector D of the above second modification of FIG. 4 employing the light ray projecting element 2 and the filter 7 with such wave length characteristics, the luminescent diode 4 for indication should preferably be an element having wave length characteristics as shown by the real line in FIG. 5, in which the light ray from the luminescent diode 4 for indication reaches its peak at the wave length of 6700 A and can pass through the filter 7, while, since the wave length of 6600 A is close to the visible limit, most of the ordinary visible light rays can not pass through the filter 7. Accordingly, if the portions of the housing 5 covered by the filter 7, such as the inner surfaces of the openings 6a and 6b for the elements 2 and 3, are adapted to be a dark shade, the inside of the housing 5 is dark so as to be invisible through the filter 7 when the luminescent diode 4 is "off," while only the reddish glow of the luminescent diode 4 is visible through the filter 7 when the diode 4 is lit, by which arrangement the "on" or "off" condition of the diode 4 is confirmed very clearly with the appearance of the detector D improved due to the fact that the inside of the detector D is invisible through the filter 7.

Referring to FIG. 6, there is shown a third modification of the embodiment in FIG. 2. In this modification, the luminescent diode 4 for indication is disposed in a position on the periphery of the housing 4 instead of being located directly between the two photoelectric elements 2 and 3, by which arrangement the detector D may be reduced in size with improved appearance of the detector itself.

It should be noted here that the conception of the luminescent diode 4 for indication and the filter 7 employed in the above modification may be applied to the detectors in FIGS. 2 and 3, and that the shape or internal construction of the housing 5 and the wave length characteristics of the photoelectric element 2, the filter 7 and the luminescent diode 4 for indication means can be modified in various ways. For example, the light ray projecting photoelectric element 2 may be one which emits visible light rays such as green light rays with a filter of sharp characteristics, for example, of an interference filter which will pass only the green light rays, in which case, since lights other than the green light rays are cut off by the filter, the adverse effect due to irregular reflection is remarkably reduced and moreover, the appearance of the detector is improved with the inside of the detector invisible through the filter, because most of the visible light rays are also cut off in this case. Furthermore, in the above case, since the green light rays emitted by the light ray projecting element is visible in addition to the green light by the diode for indication, the "on" or "off" condition of the power source can be seen besides the operating condition by the indication diode. In short, the light ray projecting element 2 may be one emitting light rays of specific wave length, the luminescent diode for the indicating means may be one which emits visible light rays and the filter may be one which will transmit the light rays of specific wave length from the projecting element and at least part of light rays from the indicating means.

As is clear from the above description, the photoelectric detector according to the present invention is so designed as to prevent noises due to irregularly reflected light rays by simple construction, and provides a stable and reliable photoelectric detector free from any erroneous functionings at extremely low cost through easiness in manufacturing. The combination of the name plate and the fixing plate for the filter with slits is very effective from the view points of saving of labor in manufacturing and also of accurate performance of the detector.

Furthermore, the provision of the special filter and the luminescent diode for indication is advantageous to quick confirmation of the correct functioning of the detector with improved appearance thereof.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A photoelectric detector having an indicator for indicating the operating condition thereof which comprises a housing, and at least a light ray projecting element and a light ray receiving element received in corresponding bores formed in said housing with front surfaces of said projecting element and said receiving element spaced away from a light ray receiving front surface of said housing by a predetermined distance so that each of said bores forms a passage of light rays between said light ray receiving front surface of said housing and each of said front surfaces of said projecting element and said receiving element, said bores for receiving said light ray projecting and receiving elements being in parallel to one another and said distance between said front surface of said housing and each front surface of said elements being determined in such an extent that an optimum angle of directivity of said detector can be obtained with any light rays due to irregular reflection prevented from reaching said light ray receiving element, and with only light rays emitted by said light ray projecting element and reflected by an object to be detected reaching said light ray receiving element, and said photoelectric detector being further provided with a third bore in parallel to and in spaced relation to said bores for said projecting element and said receiving element, said third bore receiving therein a luminescent element for indicating the operating condition of said photoelectric detector at a position visible at the front surface of said housing.

2. A photoelectric detector as claimed in claim 1, wherein said third bore is disposed between said bores for said projecting and receiving elements.

3. A photoelectric detector as claimed in claim 1, wherein said light ray projecting element and said light ray receiving element are disposed within the respective bores the same distance from the front surface of said housing and said luminescent element for indicating the operating condition of said photoelectric detector is positioned at another distance from the front surface of said housing and closer thereto.

4. A photoelectric detector as claimed in claim 1, further comprising filter means provided at said light ray receiving front surface of said housing for covering both of said projecting and receiving elements, said filter means serving for passing only light rays emitted by said projecting element and cutting off light rays due to irregular reflection so as to prevent said photoelectric detector from functioning erroneously.

5. A photoelectric detector as defined in claim 1, wherein said light ray projecting element comprises a luminescent diode of infrared rays.

6. A photoelectric detector as defined in claim 1, wherein said light ray receiving element comprises a photo transistor having a light ray receiving surface at a front portion thereof.

7. A photoelectric detector as defined in claim 1, wherein said luminiscent element comprises a luminescent diode of visible rays.

8. A photoelectric detector as defined in claim 1, further comprising one filter provided in front of said first and second element means, the filter being constructed to pass infrared and visible rays.

9. A photoelectric detector as defined in claim 1, further comprising filter means provided at said light ray receiving front surface of said housing for covering all of said projecting and receiving elements and said luminescent element, said filter means serving for passing only light rays emitted by said projecting element and said luminescent element and cutting off light rays due to irregular reflection so as to prevent said photoelectric detector from functioning erroneously.

10. A photoelectric detector as defined in claim 9, wherein said filter means is a one-piece filter.

11. A photoelectric detector as defined in claim 5, further comprising filter means provided at said light ray receiving front surface of said housing for covering both of said projecting and receiving elements, said filter means serving for passing only infrared rays emitted by said projecting element and cutting off light rays due to irregular reflection so as to prevent said photoelectric detector from functioning erroneously.

12. A photoelectric detector as defined in claim 9, wherein said light ray projecting element, said luminescent element and said filter means respectively comprise a luminescent diode of infrared rays, a luminescent diode of visible rays and a filter for passing only both of infrared rays and visible rays and cutting off light rays due to irregular reflection so as to prevent said photoelectric detector from functioning erroneously.

13. A photoelectric detector having an indicator for indicating the operating condition thereof comprising a housing, at least a first light ray projecting element and a first light ray receiving element received in corresonding parallel extending bores formed in said housing, said first projecting element and said first receiving element having the front surfaces thereof spaced fron a light ray receiving front surface of said housing by a predetermined distance so that each of said bores forms a passage of light rays beteeen said light receiving front surface of said housing and each of said front surfaces of said first projecting element and said first receiving element, the distance between said front surface of said housing and each front surface of said elements being determined such that an optimum angle of directivity of said detector can be obtained with any light rays and irregular reflection being prevented from reaching said first light ray receiving element and with only light rays emitted by said light ray projecting element and reflected by an object to be detected reaching said first light ray receiving element, a first luminescent element for indicating the operating condition of said first light ray receiving element and positioned within a third bore formed in said housing in parallel to and in spaced relation to said bores for said projecting and receiving elements, said luminescent element being visible at said front surface of said housing, and filter means being provided at said light ray receiving front surface of said housing for covering at least said first projecting element and said first receiving element, said filter means serving for passing light rays emitted by said first projecting element and cutting off light rays due to irregular reflection so as to prevent said photoelectric detector from functioning erroneously.

14. A photoelectric detector as defined in claim 13, wherein said filter means is a one-piece filter covering said projecting element, said receiving element and said luminescent element, said filter passing only light rays emitted by said projecting element and said luminescent element.

15. A photoelectric detector as defined in claim 14, wherein said projecting element is a luminescent diode of infrared rays and said luminescent element is a luminescent diode of visible rays.

* * * * *